United States Patent
White et al.

(10) Patent No.: US 9,100,585 B2
(45) Date of Patent: Aug. 4, 2015

(54) COMBINED BROADCAST AND BACKCHANNEL DELIVERY OF STREAMING CONTENT

(75) Inventors: Payton R. White, Foster City, CA (US); Stephen C. Detwiler, Oakland, CA (US); Gary M. Zalewski, Oakland, CA (US)

(73) Assignee: Sony Computer Entertainment Inc., Tokyo (JP)

(*) Notice: Subject to any disclaimer, the term of this patent is extended or adjusted under 35 U.S.C. 154(b) by 1066 days.

(21) Appl. No.: 12/259,852

(22) Filed: Oct. 28, 2008

(65) Prior Publication Data

US 2010/0106847 A1    Apr. 29, 2010

(51) Int. Cl.
G06F 15/16    (2006.01)
H04N 7/24     (2011.01)
H04N 7/52     (2011.01)
H04N 7/54     (2006.01)
G06F 15/173   (2006.01)

(52) U.S. Cl.
CPC . H04N 7/24 (2013.01); H04N 7/52 (2013.01); H04N 7/54 (2013.01)

(58) Field of Classification Search
CPC ............. H04N 7/24; H04N 7/52; H04N 7/54; H04N 21/23439
USPC ........................................................ 709/231
See application file for complete search history.

(56) References Cited

U.S. PATENT DOCUMENTS

| | | | |
|---|---|---|---|
| 4,422,093 A | 12/1983 | Pargee, Jr. | |
| 4,499,568 A | 2/1985  | Gremillet | |
| 4,506,387 A | 3/1985  | Walter | |
| 4,849,811 A | 7/1989  | Kleinerman | |
| 4,897,717 A | 1/1990  | Hamilton et al. | |
| 4,918,523 A | 4/1990  | Simon et al. | |
| 4,949,187 A | 8/1990  | Cohen | |
| 4,963,995 A | 10/1990 | Lang | |
| 4,974,178 A | 11/1990 | Izeki et al. | |

(Continued)

FOREIGN PATENT DOCUMENTS

JP    08149451    6/1996
JP    09326777    12/1997

(Continued)

OTHER PUBLICATIONS

U.S. Appl. No. 12/399,846 to Payton R. White et al., filed Mar. 6, 2009.
"ATSC Digital Television Standard Part 1—Digital Television System (A/53, Part 1:2007)", Advanced Television Systems Committee, Jan. 3, 2007, 22 pages.

(Continued)

*Primary Examiner* — Joseph Greene
(74) *Attorney, Agent, or Firm* — Joshua D. Isenberg; JDI Patent

(57) ABSTRACT

Streaming content may be delivered through a combination of broadcast and a backchannel. Related apparatus and methods for receiving and distributing streaming content are described. A receiving device may receive a packet of information in the form of a broadcast signal from a broadcast source. The packet of information may contain one or more streamlets and a table of contents associated with the streamlets. A desired streamlet may be selected from the packet of information and presented with a display. A remainder of a data stream associated with the streamlet may be requested and received from via a backchannel while the desired streamlet is being presented. The remaining data stream may then be presented with the display.

28 Claims, 3 Drawing Sheets

(56) References Cited

U.S. PATENT DOCUMENTS

| | | | |
|---|---|---|---|
| 5,010,399 | A | 4/1991 | Goodman et al. |
| 5,057,932 | A | 10/1991 | Lang |
| 5,132,992 | A | 7/1992 | Yurk et al. |
| 5,164,839 | A | 11/1992 | Lang |
| 5,276,866 | A | 1/1994 | Paolini |
| 5,539,448 | A | 7/1996 | Verhille et al. |
| 5,751,336 | A | 5/1998 | Aggarwal et al. |
| 5,831,662 | A | 11/1998 | Payton |
| 5,933,603 | A | 8/1999 | Vahalia et al. |
| 5,963,202 | A | 10/1999 | Polish |
| 5,995,705 | A | 11/1999 | Lang |
| 6,061,504 | A | 5/2000 | Tzelnic et al. |
| 6,161,137 | A * | 12/2000 | Ogdon et al. ............... 709/224 |
| 6,637,031 | B1 | 10/2003 | Chou |
| 6,763,392 | B1 | 7/2004 | Del Val et al. |
| 6,804,825 | B1 | 10/2004 | White et al. |
| 7,555,768 | B2 * | 6/2009 | Norman ............... 725/117 |
| 7,818,444 | B2 * | 10/2010 | Brueck et al. ............... 709/231 |
| 2001/0027561 | A1 | 10/2001 | White et al. |
| 2001/0027563 | A1 | 10/2001 | White et al. |
| 2003/0063217 | A1 * | 4/2003 | Smith ............... 348/460 |
| 2003/0189587 | A1 | 10/2003 | White et al. |
| 2004/0073693 | A1 * | 4/2004 | Slater et al. ............... 709/231 |
| 2004/0230797 | A1 * | 11/2004 | Ofek et al. ............... 713/168 |
| 2005/0028197 | A1 | 2/2005 | White et al. |
| 2005/0034162 | A1 | 2/2005 | White et al. |
| 2005/0044568 | A1 | 2/2005 | White et al. |
| 2005/0076379 | A1 | 4/2005 | White et al. |
| 2005/0080496 | A1 * | 4/2005 | Hayes et al. ............... 700/65 |
| 2005/0278750 | A1 * | 12/2005 | Grossman et al. ............... 725/62 |

FOREIGN PATENT DOCUMENTS

| | | |
|---|---|---|
| JP | 10108161 | 4/1998 |
| WO | 9103112 | 3/1991 |
| WO | 9844424 | 10/1998 |
| WO | 0027106 | 5/2000 |
| WO | 0163929 | 8/2001 |

OTHER PUBLICATIONS

"ATSC Digital Television Standard Part 2—RF/Transmission System Characteristics (A/53, Part 2:2007)", Advanced Television Systems Committee, Jan. 3, 2007, 44 pages.

"ATSC Digital Television Standard Part 3—Service Multiplex and Transport Subsystem Characteristics (A/53, Part 3:2007)", Advanced Television Systems Committee, Jan. 3, 2007, 27 pages.

"ATSC Recommended Practice: Implementation Guidelines for the ATSC Data Broadcast Standard (Doc. A/90)", Advanced Television Systems Committee, Jun. 10, 2001, 122 pages.

"Multicast over TCP/IP HOWTO: Multicast Transport Protocols.", Mar. 20, 1998, http://www.tldp.org/HOWTO/Multicast-HOWTO-9.html.

"Streaming Media", Wikipedia, the free encyclopedia, Publication date unknown/ Accessed Jun. 4, 2007, http://en.wikipedia.org/wiki/Streaming_media#Protocol_issues.

"User Datagram Protocol", Wikipedia, the free encyclopedia, Publication date unknown/ Accessed Jun. 4, 2007, http://en.wikipedia.org/wiki/User_Datagram_Protocol#Difference_between_TCP_and_UDP.

"Tranmission Control Protocol", Wikipedia, the free encyclopedia, Publication date unknown/ Accessed Jun. 4, 2007, http://en.wikipedia.org/wiki/Transmission_Control_Protocol#Order_data_transfer.2C_Restransmission_of_lost_packets_.26_Discarding_duplicat.

"Image:TCP state diagram.jpg", Wikipedia, the free encyclopedia, Publication date unknown/ Accessed Jun. 4, 2007, http://en.wikipedia.org/wiki/Image:TCP_state_diagram.jpg.

"Reliable User Datagram Protocol", Wikipedia, the free encyclopedia, Publication date unknown/ Accessed Jun. 4, 2007, http://en.wikipedia.org/wiki/Reliable_User_Datagram_Protocol.

Gelman et al., "A Store and Forward Architecture for Video-on-Demand Service," Proc. IEEE ICC, IEEE Press, Piscataway, N.J., 1991, pp. 27.3.1-27.3.5.

Hua et al., "Patching: A Multicast Technique for True Video-on-Demand Services," Proceedings of the ACM Multimedia 98, Sep. 12, 1998, pp. 191-200.

Jones, "The Microsoft Interactive TV System: An Experience Report," Technical Report MSR-TR-97-18, Jul. 1997.

Carter et al., "An Efficient Implementation of Interactive Video-on-Demand," Proc. of the 8th Int'l Symp. on Modeling, Analysis & Simulation etc., IEEE, 2000.

Robert Pike et al., Plan 9 from Bell Laboratories, Murray Hill, New Jersey, USA.

Arthur D. Allen, Optimal Delivery of Multi-Media Content over Networks, Burst.com Inc., Mar. 15, 2001, San Francsico, CA, USA.

Office Action dated Mar. 14, 2011 for U.S. Appl. No. 12/399,846.

* cited by examiner

COMBINED BROADCAST AND BACKCHANNEL DELIVERY OF STREAMING CONTENT

FIELD OF INVENTION

This invention relates to the delivery of streaming content, and specifically to the delivery of streaming content using a combined broadcast and backchannel approach.

BACKGROUND OF INVENTION

As digital multimedia accelerates into the mainstream, more and more people rely on this multimedia as a daily form of entertainment. From video clips to music videos to TV shows and movies, a wide range of multimedia can be found being accessed all around the world through the Internet, television, radio, etc. A common problem with accessing such multimedia, from the viewpoint of the user, is the relative speed with which receiving devices may stream content. Because receiving devices commonly stream multimedia content from one source, issues concerning bandwidth and server capabilities may limit a user's ability to access multimedia at a fast rate.

With many countries mandating a change from the presentation of multimedia with an analog signal format to a new digital format, more broadcaster-user systems have become available for users to obtain different forms of multimedia. It is within this context that embodiments of the current invention arise.

BRIEF DESCRIPTION OF THE DRAWINGS

FIG. 3A-C are schematic diagrams illustrating examples of packets of information being broadcast by the broadcaster.

DESCRIPTION OF THE SPECIFIC EMBODIMENTS

Figure 1:
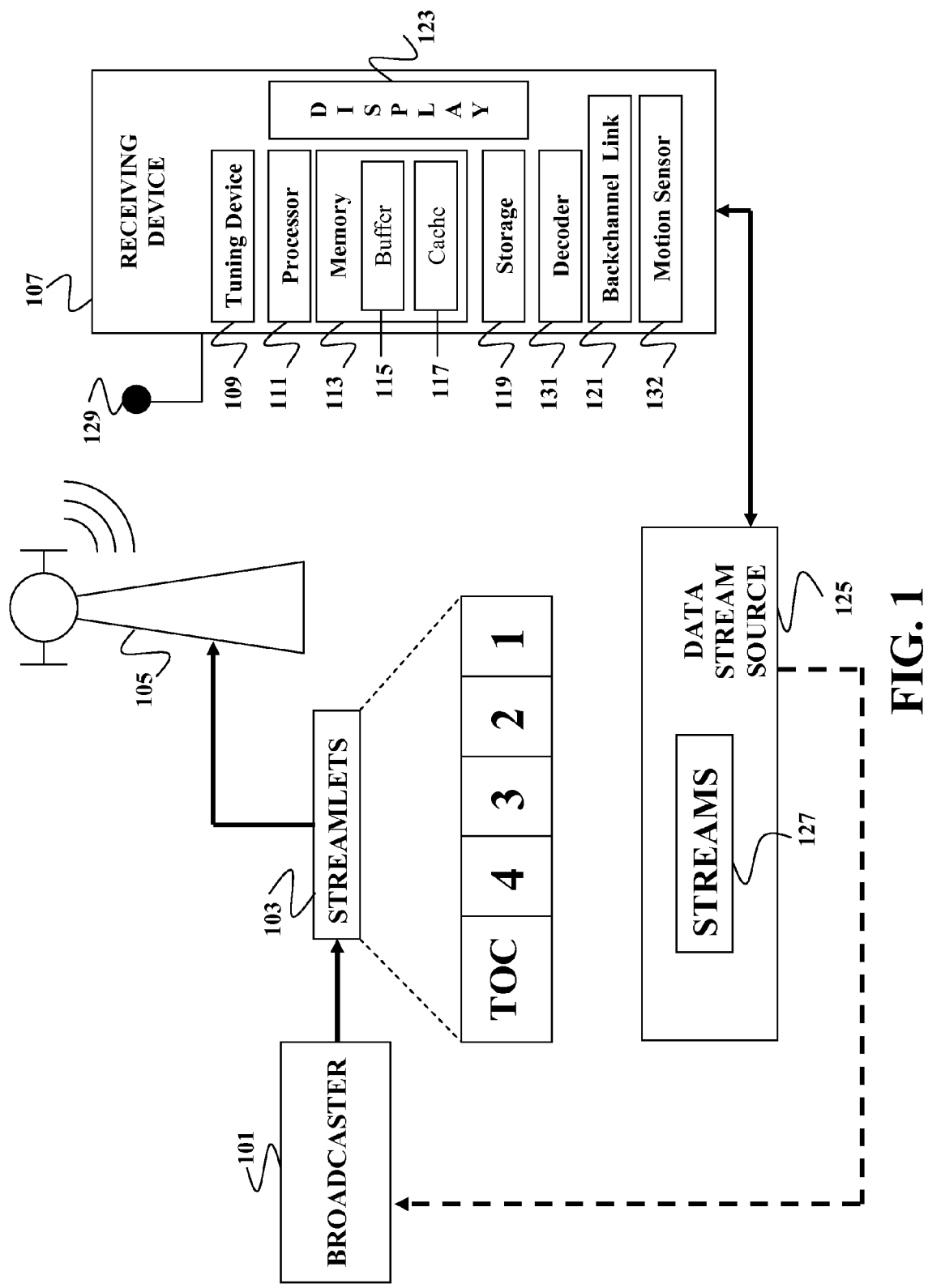
FIG. 1 is a schematic diagram illustrating an example of a combined broadcast and backchannel approach to the delivery of streaming content.

FIG. 1 is a schematic diagram illustrating an example of a combined broadcast and backchannel approach to the delivery of streaming content according to an embodiment of the present invention. A broadcaster 101 may communicate information to a user's receiving device 107 through a broadcast transmitter 105 by way of a broadcast signal. In accordance with an embodiment of the present invention, the information may be compiled by a computer processor at the broadcaster 101 or compiled elsewhere and relayed to the broadcaster 101. The information may then be relayed to the broadcast transmitter 105 in the form of a packet of information 103 containing streamlets 1, 2, 3, 4.

As used herein, the term "streamlet" refers a portion of a larger unit of streaming data. By way of example, and not by way of limitation each streamlet may represent a portion (e.g., the first ten seconds) of a video or audio clip. By way of example, and not by way of limitation, the packet of information 103 may be configured to contain streamlets 1, 2, 3, 4 of the most popular video clips being broadcast on the Internet. These streamlets are not sent in bulk, but instead are sent one-by-one, with the packet of information 103 repeating itself after each full rotation of streamlets 1, 2, 3, 4 have been broadcast by the transmitter 105. In addition to these streamlets, the packet of information 103 may contain a table of contents TOC, informing the user of the receiving device 107 of what streaming content is available for viewing within the packet of information 103. The table of contents TOC, like the streamlets 1, 2, 3, 4, may be included in each rotation of the packet of information 103.

By way of example, a digital broadcast signal may be a modulated radiation signal transmitted from a broadcast transmitter 105, e.g., in the form of an over-the-air broadcast, such as by a radio-frequency electromagnetic wave signal. Alternatively, embodiments of the invention may be used in conjunction with digital broadcasts transmitted over media such as cable (e.g., coaxial cable), optical fiber, or satellite transmission.

By way of example, the digital broadcast signal may be configured in accordance with a digital broadcast standard. Examples of digital broadcast standards include, but are not limited to, the Digital Video Broadcasting (DVB) family of standards maintained in Europe and Australia, the Advanced Television Standards Committee (ATSC) family of standards developed for use in the United States and Canada, the Integrated Services Digital Broadcasting (ISDB) family of standards developed for use in Japan, and the Digital Multimedia Broadcasting (DMB) standard used in South Korea.

The DVB family of standards includes the DVB-S and DVB-S2 standards for satellite television, the DVB-T and DVB-T2 standards for terrestrial television, the DVB-C standard for cable televisions, the DVB-H standard for mobile television, and other DVB standards, which have been or may be developed. The ATSC family of standards includes the ATSC standard for terrestrial television broadcasts and the ATSC M/H standard for broadcasts to mobile and handheld devices. The IDSB family of standards includes the ISDB-S, ISDB-T, and ISDB-C standards, which were developed for satellite, terrestrial, and cable television respectively.

By way of example, and not by way of limitation, the digital broadcast signal may be configured according to the ATSC or ATSC-M/H standards. The ATSC standard is described in detail, e.g., in "ATSC Digital Television Standard Part 1—Digital Television System" (A/53, Part 1:2007), "ATSC Digital Television Standard Part 2—RF/Transmission System Characteristics" (A/53, Part 2:2007), and "ATSC Digital Television Standard Part 3—Service Multiplex and Transport Subsystem Characteristics" (A/53, Part 3, 2007), the disclosures of all three of which are incorporated herein by reference. The ATSC Data Broadcast Standard is described, e.g., in (ATSC Recommended Practice: Implementation Guidelines for the ATSC Data Broadcast Standard (Doc. A/90)", which is incorporated herein by reference.

The user of the receiving device 107 may receive these broadcast packets of information 103 through an antenna 129. The receiving device may contain in addition to an antenna 129: a tuning device 109, a processor 111, a memory 113, a storage device 119, a backchannel communication link 121, and a display device 123. The digital broadcast receiving device 107 may be any type of device capable of receiving and utilizing the digital broadcast signal. By way of example, the digital broadcast receiving device 107 may be a digital television set, digital radio receiver, personal computer, laptop computer, or a mobile or handheld device such as a cellular telephone, mobile Internet device, or mobile digital television receiver. Furthermore, the term digital broadcast receiving device encompasses "digital media receivers", GPS devices, game consoles, portable game devices, home, mobile or device security systems, and any combination thereof and including other devices for which the present invention may be coupled to provide command and control.

The receiving device 107 may include a digital broadcast tuning device 109 and a decoder 131. The tuning device 109 may be coupled to the antenna 129 that receives the digital broadcast signal. The tuning device 109 may select one or more particular frequencies from among the various signals that are picked up by the antenna 129. The decoder 131 may then extract the data from the digital broadcast signal and process it. By way of example, the tuning device 109 and decoder 131 may provide the following functions: demodulation, transport stream demultiplexing, decompression, error correction, analog-to-digital conversion, AV synchronization, and media reformatting. As used herein, demodulation refers to the process of transforming the received digital broadcast signal into a usable signal from which data may be extracted and/or from which quality images and sound may be produced.

Transport stream demultiplexing may be implemented, e.g., where multiple information packets 103 are combined and then transmitted from one antenna source to create over the air broadcasts. The decoder 131 may implement decompression if the information packet 103 contains data in compressed form. The tuning device 109 may decompress such data, e.g., by unpacking compressed packets of digital data to their original size.

The decoder 131 may also implement error correction to make sure that any data that is missing from the received broadcast signal can be corrected. For instance, sometimes interference or a poor-quality signal will cause the loss of data information that the tuning device 109 receives. In such cases, the decoder 131 may perform a number of checks and repair data.

The decoder 131 may implement AV synchronization to coordinate audio and video signals being displayed on the display 123 in proper time. AV synchronization ensures that the audio does not lag behind the video that is being displayed on the display 123 or vice versa, so that both audio and video are in sync. Media reformatting allows the display 123 to properly display video images using the data extracted from the digital broadcast signal. Media reformatting is important because the formatting of images on certain displays may differ significantly according to the technology employed. For example, some televisions utilize an interlaced picture, whereas others utilize a progressive-scan picture.

The information associated with the streamlets 1, 2, 3, 4 of the packet of information 103 may be displayed on the video display 123. By way of example, and not by way of limitation, the streamlets 1, 2, 3, 4, may contain video clips and the display 123 may be any suitable video and/or audio-visual display compatible with the digital broadcast signal. By way of example, and not by way of limitation, the display 123 may include a video monitor, such as a cathode ray tube (CRT), plasma display, liquid crystal display (LCD) or an organic light-emitting diode (OLED) display. In addition, the display 123 may include one or more devices for generating audio, e.g., one or more speakers.

The processor 111 may be configured to allow the user of the receiving device 107 to communicate with the receiving device 107. Furthermore, the processor may be configured to run software applications, and optionally, an operating system.

The memory 113 may store applications and data for use by the processor 111. The memory 113 may implement both a buffer 115 and a cache 117. Alternatively, the cache 113 and buffer 115 may be implemented by separate components. The buffer 115 is configured to process data immediately as it is received, whereas the cache 117 is configured to store data until the processor 111 or user decides to use the data. The memory 113 may be in the form of an integrated circuit, e.g., RAM, DRAM, ROM, and the like. A computer program may be stored in the memory 113 in the form of instructions that can be executed on the processor 111.

The receiving device 107 may further include a fast data storage device 119 such as a hard disk drive that provides non-volatile storage for applications and data. The fast storage device 119 may be used for temporary of long-term storage of files retrieved from a slower data storage device. By way of example, the storage device 119 may be, e.g., a CD-ROM, DVD-ROM, Blu-Ray, HD-DVD, UMD, or other optical storage devices.

Lastly, the receiving device 107 may implement a backchannel communication link 121 that allows information to be sent from the receiving device 107 to a remote data stream source (e.g. a web server for a website or other network source). In some embodiments, the receiving device 107 may implement a back channel to the broadcaster through a digital broadcast signal transmitted from the receiving device 107 and antenna 129, e.g., using a digital broadcast, multicast or unicast capability built into the tuning device 109. Alternatively, the back channel may be implemented through the backchannel communication link 121 by some other mode of communication such as wireless telephony, wireless Internet, cable, optical fiber, computer network (e.g., Ethernet) link, and the like. The back channel may also be used to receive data from a remote data stream source 125.

Once the digital broadcast signal has been picked up by the antenna 129 and decoded by the decoder 131, the receiving device 107 can begin to process the streamlets 1, 2, 3, 4 contained in the information packet 103. When the rotation of streamlets 1, 2, 3, 4 in the packet of information 103 reaches the table of contents TOC, the receiving device may store this information in the memory 113 or cache 117. The device 107 may be programmed to notify the user of which streamlets 1, 2, 3, 4 are being broadcast in the packet of information 103, e.g., via a message presented with the display 123. At this point, the processor 111 may request the tuning device 109 to obtain additional broadcast signals with updated packets of information 103, such that the user of the receiving device 107 is updated with the latest streamlets 1, 2, 3, 4 at all times.

The user of the receiving device 107 can then select which streamlet 1, 2, 3, 4 to display on the video display 123. Once on of the streamlets 1, 2, 3, 4 has been selected, the data is sent to the memory 113's buffer 115 to be immediately processed and displayed on the video display 123. As soon as the selected streamlet begins to be displayed, the receiving device 107 may communicate with a data stream source 125 through the backchannel communication link 121 to request the remaining data for the full data stream associated with the streamlet that was selected. The data stream source 125 has access to full versions of data streams 127 associated with streamlets 1, 2, 3, 4. In addition to sending a request to the data stream source 125 through the backchannel communication link 121, the receiving device 107 may also send an indication of the time duration of the selected streamlet 1, 2, 3, 4. This indication allows the data stream source 125 to offset the full stream associated with the streamlet 1, 2, 3, 4 by the duration of the streamlet 1, 2, 3, 4. This allows the user of the receiving device 107 to receive the full data streams associated with the streamlets without perceiving any delay associated with having to retrieve the full data stream from the remote data stream source 125 via the backchannel communication link 121.

The table of contents TOC that is stored in the cache 117 may have an expiration time. The device 107 may be programmed to delete the table of contents TOC from the cache 117 once the expiration time has transpired. Once the table of contents TOC has expired, the user of the receiving device 107 may request the tuning device 109 to obtain additional broadcast signals with updated versions of the packet of information 103. Furthermore, the receiving device 107 may be configured to work with a motion sensor 132, such as an accelerometer, gyroscope, laser gyroscope or tilt sensor that is coupled to the processor 111. By way of example, and not by way of limitation, the motion sensor 132 may be physically attached to a case or housing that contains other components of the device 107. The processor may be programmed to interpret signals from the motion sensor 132 in such a way as to determine when device 107 has been picked up and interpret this as a signal to initiate receipt of updated packets of information 103. Once the table of contents TOC has expired and been deleted from the memory 113's cache 117, the user may initiate the tuning device 109 to receive updated packets of information 103 in response to a signal generated by the motion sensor 132 when the user picks up the device or otherwise actively grabs it.

In some embodiments, the data stream source 125 may communicate with the broadcaster 101 and indicate to the broadcaster which data streams were most often requested. This allows the broadcaster 101 to update the packets of information 103 such that they contain the most updated version of the streamlets.

Figure 2:
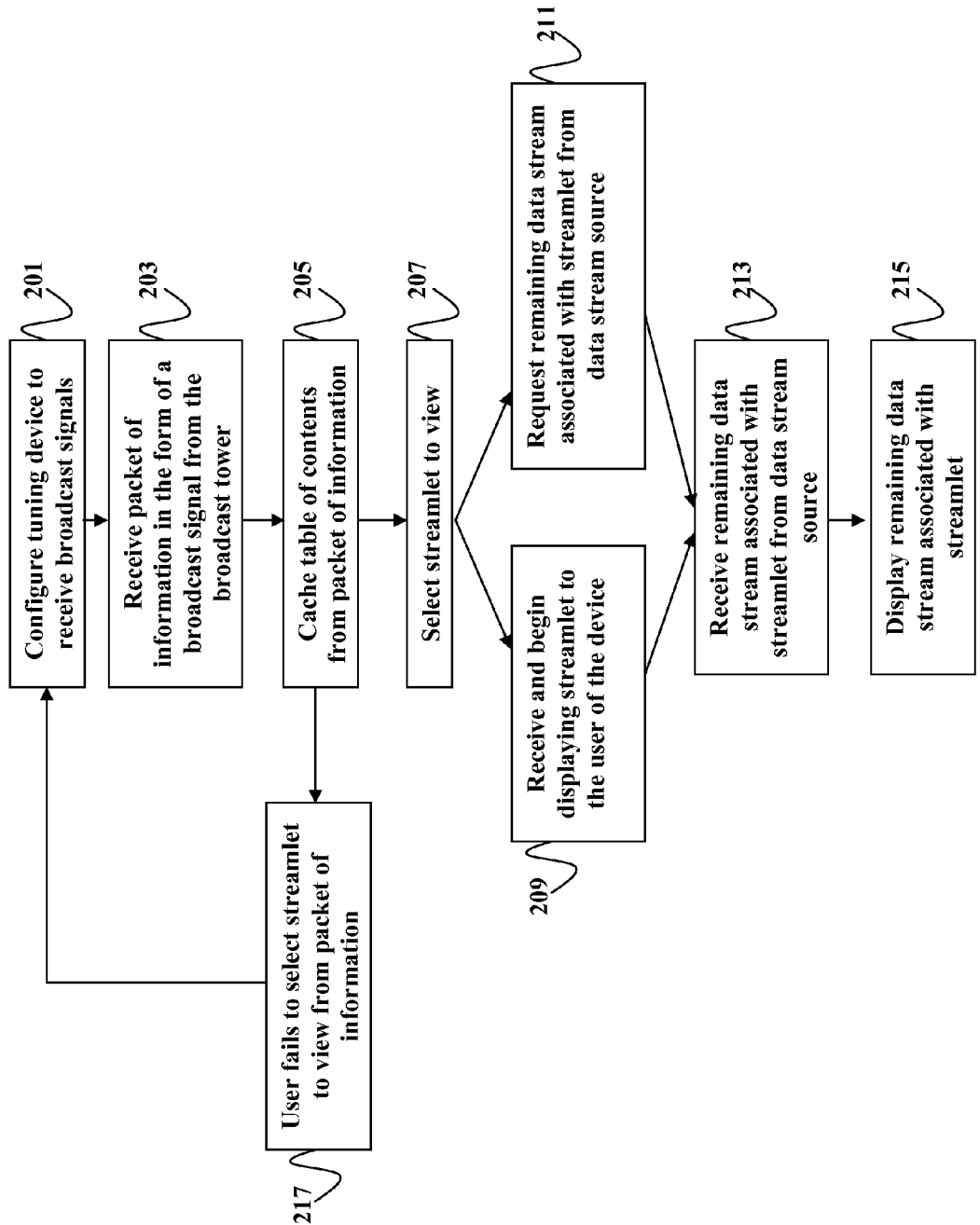
FIG. 2 is a flow diagram illustrating the process of combined broadcast and backchannel delivery of streaming content from the perspective of the user of the receiving device.

FIG. 2 is a flow diagram illustrating the process of combined broadcast and backchannel delivery of streaming content from the perspective of the percipient user of the receiving device. Initially the receiving device must configure the tuning device to receive broadcast signals from a broadcast tower as indicated at 201. This can be done in multiple ways. The user may directly communicate with the receiving device and request that the tuning device be configured to receive broadcast signals from the broadcast tower. The receiving device may also be programmed to continuously receive broadcast signals from a broadcast tower based on a timing mechanism, such that the tuner looks for updated broadcast signals every given segment of time. Alternatively, the tuning device can be configured to respond to motion, as described above. For example, an idle receiving device may initiate contact with a broadcast tower when the user of the device picks it up.

Once the tuning device has been configured to receive broadcast signals from the broadcast tower, the receiving device may to receive the packet of information containing a table of contents and streamlets as indicated at 203. The streamlets are sent to the user in a rotation, such that no streamlet needs to be stored in the receiving device's memory. As discussed above, the packets of information also contain a table of contents, which is cached in the receiving device's memory such that the user has a catalog of what video streamlets are available to view as indicated at 205. The table of contents may have an associated expiration time, such that once this time has expired the tuning mechanism of the receiving device may automatically configure itself to receive updated broadcast signals from a broadcast tower.

The user of the receiving device may then select a streamlet to watch from the packet of information as indicated at 207. The user may use the table of contents to decide which streamlet to select or may wait for each streamlet to be sent to the receiving device via the broadcast tower 105 before selecting a streamlet to view. If, as indicated at 217, the user chooses not to select a streamlet to view from the particular packet of information 103, the receiving device may tune the device in order to receive an updated version of the packet of information.

As soon as the user has selected a streamlet to view, the receiving may tune in to the broadcast tower 105 to receive the entire streamlet as indicted at 209. The streamlet may be stored in the buffer 115 and displayed with the display 123. Simultaneously, the receiving device 107 may communicate with the data stream source 125 to receive the remaining data stream associated with the streamlet as indicated at 211. The device 107 may automatically send a request to the data stream source 125 indicating which data stream is desired. In addition, the device 107 may send an indication of the offset of the data stream needed to complete the entire video clip. The data stream source 125 processes this information, and sends the remaining data stream necessary to complete the video clip.

The receiving device receives the remaining data stream necessary to complete the video clip by placing this data in the buffer of the receiving device's memory as indicated at 213. The receiving device 107 may then convert the remaining data stream into a form compatible with presentation on the display 123. The remaining data stream may then be displayed to the user as indicated at 215. The user of the receiving device 107 may thus watch an entire video clip through the combined broadcast and backchannel delivery of the streaming content. The user does not have to wait for the remaining data to be received from a remote source, and then watch the remaining stream associated with the initial streamlet. Instead, the user can watch the entire video clip without pause because as the initial streamlet is being presented, the receiving device may obtaining at least part of the remaining portion of the video clip from a data stream source, such that as soon as the streamlet ends, a portion of the remaining stream is ready to be displayed to the user.

Figures 3A, 3B, 3C:
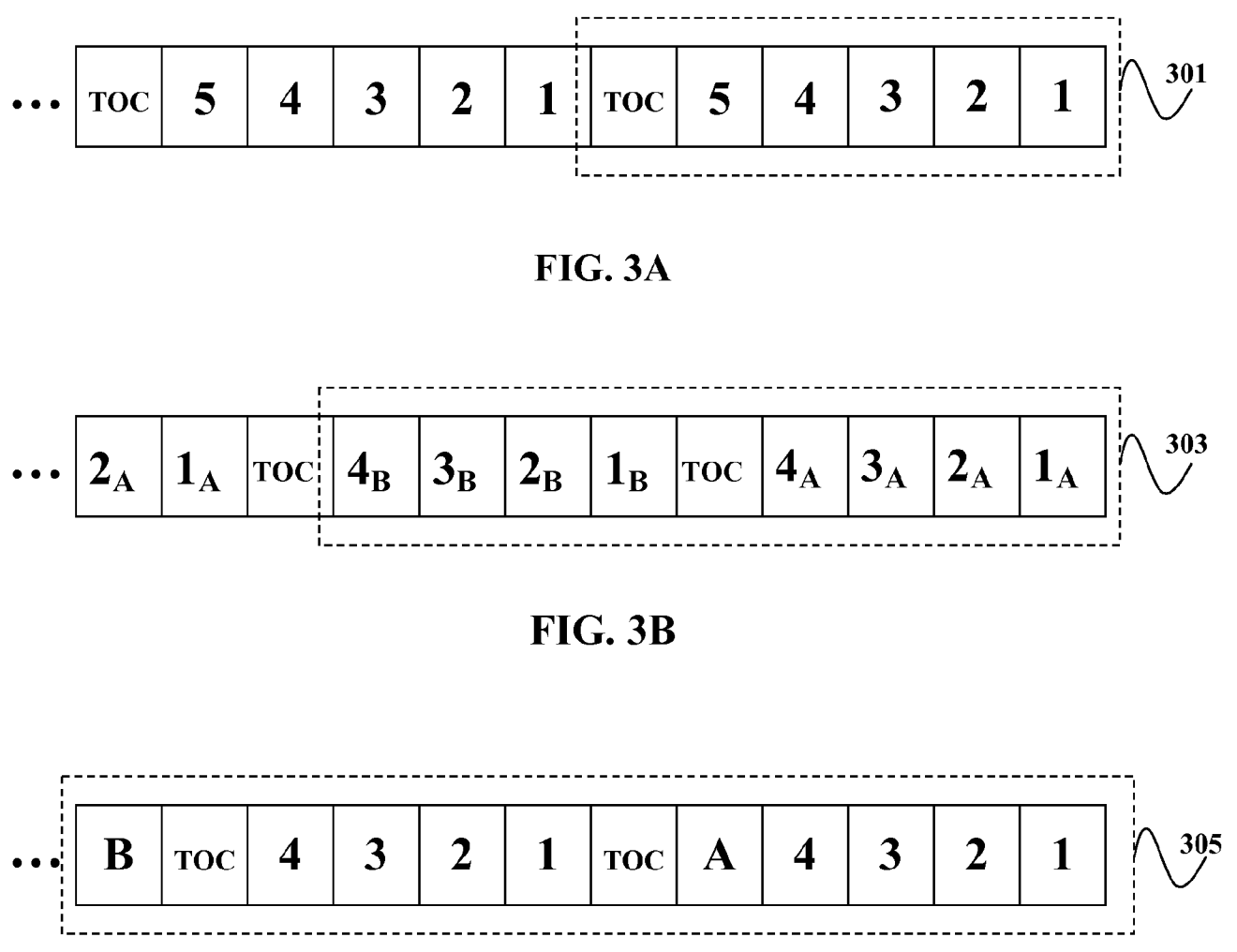

According to embodiments of the present invention, there are a number of ways in which the packet of information 103 may be compiled for broadcast. Such compilation may be done in accordance with suitable configured computer program instructions. FIG. 3A is a diagram illustrating an example of a packet of information 301 to be sent by the broadcaster 101 via a broadcast transmitter. In this example, the packet of information 301 is sent through a rotational scheme in which all of streamlet 1 is sent before all of streamlet 2, and so on, with the rotation repeating once all streamlets 1, 2, 3, 4, 5 and the table of contents TOC have been broadcast. At the end of each rotation of streamlets, a device may receive and store the table of contents TOC, which can be stored in the cache so that the user of the receiving device may access it at any time. The user may then select a streamlet 1, 2, 3, 4, 5 to view at any time after receiving any portion of the packet of information from the broadcaster. The streamlets 1, 2, 3, 4, 5 and table of contents TOC each have the same periodicity, so that each one repeats after an equal interval of time.

FIG. 3B is a diagram illustrating another example of a packet of information 303 to be sent by the broadcaster to the percipient user of the receiving device via a broadcast tower. In this example, the streamlets that make up the packet of information 303 are broken down into portions that are broadcast sequentially. The packet of information 303 is sent through an interleaving scheme in which a portion of each streamlet $1_A, 2_A, 3_A, 4_A$ is sent in order, followed by a table of contents TOC, followed by a subsequent portion of each streamlet $1_B, 2_B, 3_B, 4_B$. The user of the percipient device may send these portions of streamlets directly to the buffer of the device's memory to be immediately processed, or may send these portions of streamlets to the memory's cache to be temporarily stored and processed at a later time. Note that the table of contents TOC has a shorter period than the periodicity of each individual streamlet 1, 2, 3, 4 because the streamlets are broadcast in portions.

FIG. 3C is a diagram illustrating a third example of a packet of information to be sent by the broadcaster to the percipient user of the receiving device via a broadcast tower. This packet of information 305 is sent through a tiered scheme in which certain streamlets 1, 2, 3, 4 (e.g. most popular video clips) are sent with a shorter periodicity than other streamlets A, B, etc. (e.g. less popular video clips/advertisements). By creating a tiered scheme, the user is presented more popular data streams at a higher frequency than less popular data streams. Note that the table of contents TOC is still being sent at a periodicity equal to the most popular data stream.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A method for receiving streaming content, comprising:
   a) receiving a packet of information in the form of a broadcast signal from a broadcast source with a receiving device, wherein the packet of information contains one or more streamlets and a table of contents associated with the streamlets, wherein the table of contents includes information identifying what content is available within the packet of information, wherein each said streamlet is an ordered grouping of multiple data packets that correspond to a presentable portion of a larger unit of streaming data that is associated with the streamlet;
   b) selecting a desired streamlet from the packet of information;
   c) presenting the desired streamlet with a display associated with the receiving device;
   d) requesting a remainder of the larger unit of streaming data associated with the desired streamlet by the receiving device from a data stream source separate from the broadcast source while the desired streamlet is being presented;
   e) receiving the remainder of the larger unit of streaming data associated with the desired streamlet via a backchannel from the data stream source while the desired streamlet is being presented, wherein the backchannel is implemented by a mode of communication other than a broadcast signal from the broadcast source; and
   f) presenting the remainder of the larger unit of streaming data associated with the desired streamlet with a display associated with the receiving device.

2. The method of claim 1, wherein a) includes receiving a packet of information sent via a rotational scheme wherein an entire streamlet of the packet is received before a subsequent streamlet of the packet is received.

3. The method of claim 2 the packet of information is broadcast repetitively.

4. The method of claim 1, wherein a) includes receiving a packet of information sent via an interweaving scheme wherein initial portions of each streamlet in the packet of information are received in order, followed by the table of contents, followed by subsequent portions of each of the streamlets, followed again by the table of contents.

5. The method of claim 4 wherein receiving the packet of information according to the interweaving scheme repeats after a last portion of each individual streamlet has been broadcast.

6. The method of claim 1, wherein a) includes receiving a packet of information sent via a tiered scheme, wherein the streamlets in the packet of information are sent at a repetition rate based on a tiered prioritization, wherein streamlets of a lower priority are sent at a longer periodicity than streamlets of a higher priority.

7. The method of claim 6 wherein the packet of information repeats itself once the last streamlet and table of contents have been broadcast.

8. The method of claim 1, wherein a) includes receiving a table of contents with an expiration, wherein the expiration informs the receiving device to receive an updated packet of information upon the expiration of the table of contents.

9. The method of claim 1, wherein a) includes receiving an updated packet of information in response to conditions triggering a motion sensor component of the receiving device.

10. The method of claim 1, wherein d) includes requesting the remainder of the data stream associated with the desired streamlet through the backchannel.

11. The method of claim 1, further comprising after a) and before b) storing the information packet in a memory associated with the receiving device.

12. The method of claim 1 wherein the broadcast signal is a digital broadcast signal.

13. An apparatus for receiving streaming content, comprising:
    a tuning device configured to receive a broadcast signal;
    a computer processor coupled to the tuning device;
    a memory coupled to the processor;
    a backchannel communication link coupled to the processor; and
    a set of computer executable instructions that when executed by the processor cause the receiving device to implement a method for receiving streaming content, the method comprising:
    a) receiving a packet of information with the tuning device in the form of a broadcast signal from a broadcast source, wherein the packet of information contains one or more streamlets and a table of contents associated with the streamlets, wherein the table of contents includes information identifying what content is available within the packet of information, wherein each said streamlet is an ordered grouping of multiple data packets that correspond to a presentable portion of a larger unit of streaming data that is associated with the streamlet;
    b) selecting a desired streamlet from the packet of information;
    c) presenting the desired streamlet with a display coupled to the processor;
    d) requesting a remainder of the larger unit of streaming data associated with the desired streamlet by the receiving apparatus from a data stream source separate from the broadcast source while the desired streamlet is being presented;
    e) receiving the remainder of the larger unit of streaming data associated with the desired streamlet through the backchannel communication link from the data stream source while the desired streamlet is being presented, wherein the backchannel is implemented by a mode of communication other than a broadcast signal from the broadcast source; and f) presenting the remainder of the larger unit of streaming data associated with the desired streamlet with the display.

14. The apparatus of claim 13, wherein a) includes receiving a packet of information sent via a rotational scheme wherein an entire streamlet of the packet is received before a subsequent streamlet of the packet is received.

15. The apparatus of claim 13, wherein a) includes receiving a packet of information sent via an interweaving scheme wherein initial portions of each streamlet in the packet of information are received in order, followed by the table of contents, followed by subsequent portions of each of the streamlets, followed again by the table of contents.

16. The apparatus of claim 13, wherein a) includes receiving a packet of information sent via a tiered scheme, wherein the streamlets in the packet of information are sent based on a tiered prioritization, wherein streamlets of a lower priority are sent at a longer periodicity than streamlets of a higher priority.

17. The apparatus of claim 13, wherein a) includes receiving a table of contents with an expiration, wherein the expiration informs the receiving device to receive an updated packet of information upon the expiration of the table of contents.

18. The apparatus of claim 13, wherein a) includes receiving an updated packet of information in response to conditions triggering a motion sensor component of the receiving device.

19. The apparatus of claim 13, further comprising after a) and before b) storing the information packet in the memory.

20. The apparatus of claim 13, further comprising a motion sensor coupled to the processor, wherein a) includes receiving an updated packet of information in response to a trigger signal from the motion sensor.

21. The apparatus of claim 13 wherein the tuning device is configured to receive a digital broadcast signal.

22. The method of claim 1, wherein the packet of information includes two or more streamlets.

23. The method of claim 22, wherein the information included in the table of contents identifies what content is available in each of the two or more streamlets.

24. The method of claim 23, wherein b) includes selecting the desired streamlet from among the two or more streamlets using the information in the table of contents.

25. The apparatus of claim 13, wherein the packet of information includes two or more streamlets.

26. The apparatus of claim 25, wherein the information included in the table of contents identifies what content is available in each of the two or more streamlets.

27. The apparatus of claim 26, wherein b) includes selecting the desired streamlet from among the two or more streamlets using the information in the table of contents.

28. The apparatus of claim 13, said apparatus further comprising:

the display coupled to the processor.

* * * * *